(12) United States Patent
Ducate, Jr.

(10) Patent No.: US 7,588,026 B2
(45) Date of Patent: Sep. 15, 2009

(54) OUTDOOR GRILL SAFETY APPARATUS

(75) Inventor: John Ducate, Jr., Columbia, SC (US)

(73) Assignee: The Grill Company, LLC, Columbia, SC (US)

( * ) Notice: Subject to any disclaimer, the term of this patent is extended or adjusted under 35 U.S.C. 154(b) by 354 days.

(21) Appl. No.: 11/495,104

(22) Filed: Jul. 28, 2006

(65) Prior Publication Data

US 2008/0066730 A1    Mar. 20, 2008

(51) Int. Cl.
*A47J 37/00* (2006.01)
*B60R 7/00* (2006.01)
*A47G 23/02* (2006.01)

(52) U.S. Cl. .................... 126/25 R; 248/153; 224/403; 224/549; 224/553; 224/282

(58) Field of Classification Search ............... 126/41 R, 126/9 R, 9 B, 276, 40, 50, 25 R, 39 R, 39 B; 431/344, 343; 248/188.1, 188.8, 127, 129, 248/130, 133, 146, 107, 110, 111, 112, 121, 248/124.1, 126, 153, 175, 218.1, 249, 27.5, 248/302, 37.3, 37.69, 511, 512, 518, 523, 248/59, 682, 690, 691, 154; 99/357, 339, 99/340, 449; 224/282, 403, 553, 549, 148.7
See application file for complete search history.

(56) References Cited

U.S. PATENT DOCUMENTS

| | | | | |
|---|---|---|---|---|
| 359,953 | A | * | 3/1887 | Atwood .................... 248/217.2 |
| 895,563 | A | * | 8/1908 | Holland ........................ 248/249 |
| 1,224,947 | A | * | 5/1917 | MacDougall ................ 248/690 |
| 1,328,271 | A | * | 1/1920 | Dutemple ................... 248/313 |
| 1,423,043 | A | * | 7/1922 | Steinheiser ................. 248/682 |
| 1,487,085 | A | * | 3/1924 | Blackshear .................... 211/65 |
| 1,936,664 | A | | 11/1933 | Fransosi |
| 2,278,232 | A | | 3/1942 | Anderson |
| 2,778,588 | A | * | 1/1957 | Capocci ....................... 248/112 |
| 3,399,854 | A | | 9/1968 | Patterson |
| 3,463,429 | A | | 8/1969 | Novak |
| 3,753,543 | A | * | 8/1973 | Burrell et al. ................ 248/313 |
| 4,331,310 | A | * | 5/1982 | Silva et al. ................... 248/146 |
| 4,630,752 | A | * | 12/1986 | DeMars ................. 220/495.08 |
| 4,934,333 | A | * | 6/1990 | Ducate et al. .................. 126/24 |
| 5,458,309 | A | | 10/1995 | Craven, Jr. et al. |
| 5,533,701 | A | * | 7/1996 | Trank ....................... 248/316.4 |
| 5,577,699 | A | * | 11/1996 | Gardner et al. ........... 248/218.3 |
| 5,690,423 | A | * | 11/1997 | Hentz et al. .................. 362/365 |

(Continued)

*Primary Examiner*—Kenneth B Rinehart
*Assistant Examiner*—Jorge Pereiro
(74) *Attorney, Agent, or Firm*—McNair Law Firm, P.A.; Hunter S. Freeman; Douglas W. Kim (57) ABSTRACT

The invention is directed towards an apparatus and method for a securing device for securing a fuel tank to an outdoor gas grill. The invention helps ensure that the securing device will be used to secure the fuel tank in position within the grill to prevent unnecessary shifting or movement of the fuel tank. The securing device can include an extension arm adapted for being carried by the grill, at least one retaining member that defines a collar area for receiving the collar of a grill and a regulator receiving arm carried by the retaining members that defines a regulator area for allowing the device to place the fuel tank in a secured position without being hindered by the fuel line, collar, or regulator.

12 Claims, 6 Drawing Sheets

U.S. PATENT DOCUMENTS

| | | | | |
|---|---|---|---|---|
| 5,799,849 A * | 9/1998 | Beer et al. | ............ | 224/403 |
| 6,318,568 B1 | 11/2001 | McCord | | |
| 6,386,559 B1 * | 5/2002 | Souza | ............ | 280/47.26 |
| 6,726,159 B2 | 4/2004 | Brake | | |
| 6,766,997 B2 * | 7/2004 | Stewart, III | ............ | 248/690 |
| 6,817,314 B1 * | 11/2004 | Conte | ............ | 119/72.5 |
| 2003/0025050 A1 * | 2/2003 | Brake | ............ | 248/154 |
| 2004/0051025 A1 * | 3/2004 | Stewart, III | ............ | 248/690 |
| 2004/0244790 A1 * | 12/2004 | McKenzie et al. | ............ | 126/41 R |

* cited by examiner

OUTDOOR GRILL SAFETY APPARATUS

FIELD OF THE INVENTION

This invention is directed toward a safety apparatus for an outdoor grill and more specifically, to a safety device for securing a fuel tank associated with an outdoor gas grill.

BACKGROUND OF THE INVENTION

Often times it is desirable to transport a grill from one location to another. Outdoor grills employ a fuel source which, when ignited, provide a heat source for cooking food. Propane is a popular fuel source and is contained in a propane fuel tank which can be refilled or exchanged for another tank when the fuel inside the tank is exhausted. The fuel is stored under pressure within the fuel tank therefore allowing for more propane to be stored within the fuel tank. Even with the advent of modern outdoor grills, the flammable fuel under pressure still creates a safety risk concerning the fuel and fuel tank.

In operation, the fuel tank contains a valve which controls the release of fuel from the fuel tank. A fuel feed line is connected to the fuel tank at one end and to the burners of a grill at another end and allows fuel to flow between the fuel tank, through the fuel line, to the burner where the fuel is ignited to produce heat. A regulator attached to the fuel line controls the flow rate of fuel from the fuel tank to the fuel line.

Since the fuel is both flammable and pressurized, safety risks can exist when fuel is allowed to escape the fuel tank abnormally such as when there is damage to the fuel tank valve, fuel line or connection between the fuel tank and fuel line. Of particular concern is when damage to the fuel tank or fuel tank valve causes a sudden release of pressurized fuel such as when the fuel tank ruptures or when the fuel tank valve is abnormally detached from the fuel tank such as when the valve is sheered from the fuel tank. A tank rupture or valve sheer can result in a violent explosion which can endanger the lives of any individuals who are in proximity to the fuel tank when a rupture or valve sheer occurs.

One event which can cause a tank rupture or valve sheer is when the fuel tank is dropped, falls, or is otherwise displaced from a secured position. Particularly, when an outdoor grill is moved, the fuel tank, if not properly secured, can fall or otherwise become dislodged from the grill, causing a tank rupture, valve sheer, damage to the fuel line and damage to the regulator.

Of particular concern is when a fuel tank overturns while connected to the grill since this can cause damage leading to a tank rupture, valve sheer or other damage. Therefore, there is a need for a safety apparatus that will help secure the outdoor grill in a proper position.

Attempts to provide such a safety apparatus have met with limited success. For example, chains, screws or metal rods have been used to attempt to secure the fuel tank to the outdoor grill. However, owners of the outdoor grill use these devices sporadically and can easily by-pass the safety devices. By their very design, these safety devices have become optional for the owner of the outdoor grill and, therefore, do not adequately ensure that the safety device will prevent the fuel tank from falling or even rolling out of or dropping from the outdoor grill.

It is an object of the present invention to provide a safety apparatus which helps the owner utilize the safety device to secure a grill, preventing it from unnecessarily moving or shifting position in the grill during movement of the grill.

SUMMARY OF THE INVENTION

The invention is directed towards . . . .

DESCRIPTION OF THE DRAWINGS

The invention will be described in more detail from a reading of the following specification and by reference to the accompanying drawings, wherein an example of the invention is shown as follows.

DESCRIPTION OF THE INVENTION

Figure 1:
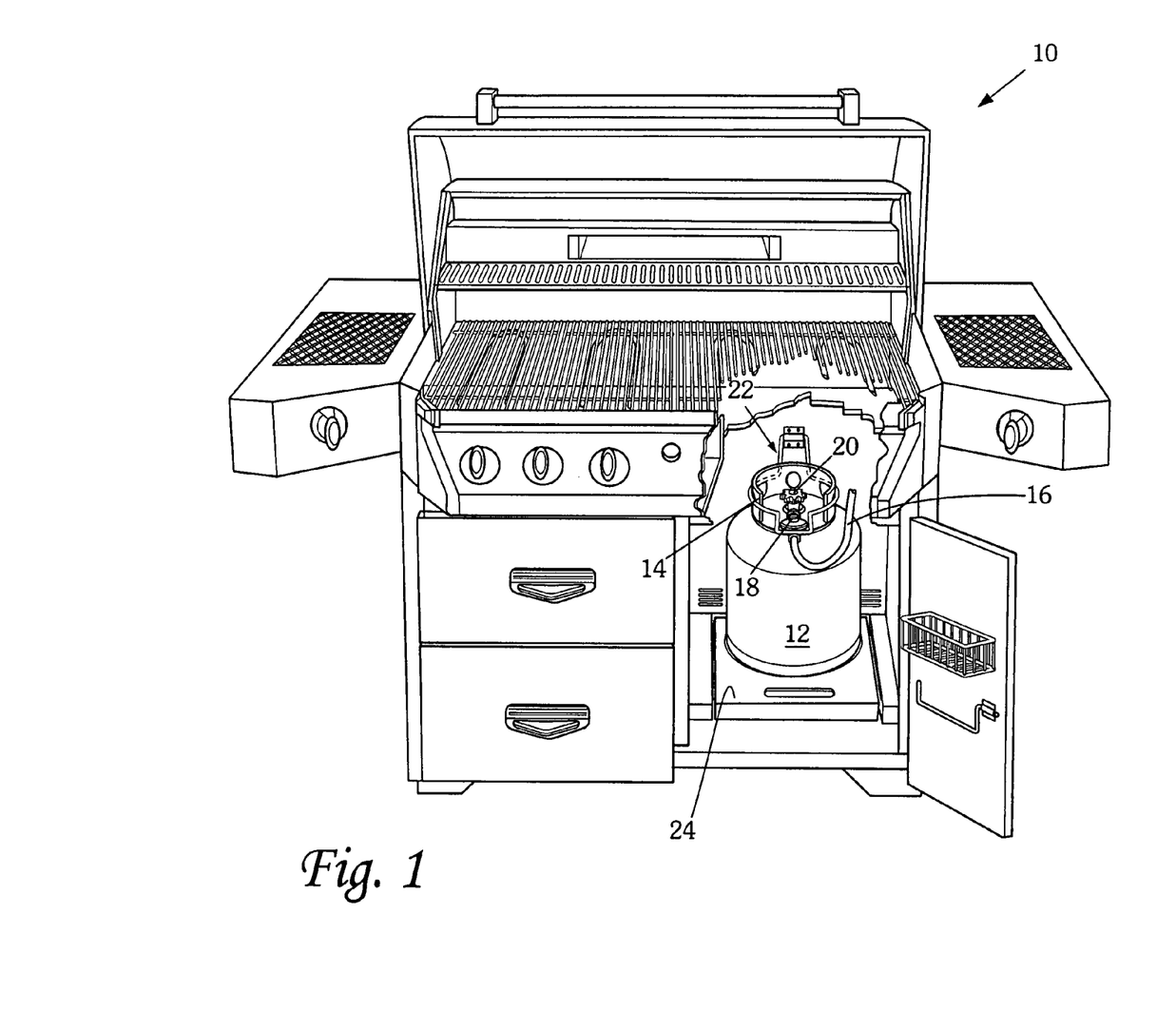
FIG. 1 is a front elevation view of a grill having a cutaway portion showing the invention.

Referring to FIG. 1, a grill 10 having a fuel tank 12 with a collar 14, a fuel line 16, and a regulator 18 for connection to a fuel valve 20 is shown. A securing device is shown generally as 22. A base 24 having a recess (shown as 26 in FIG. 2) for receiving the fuel tank may be provided.

Figure 2:
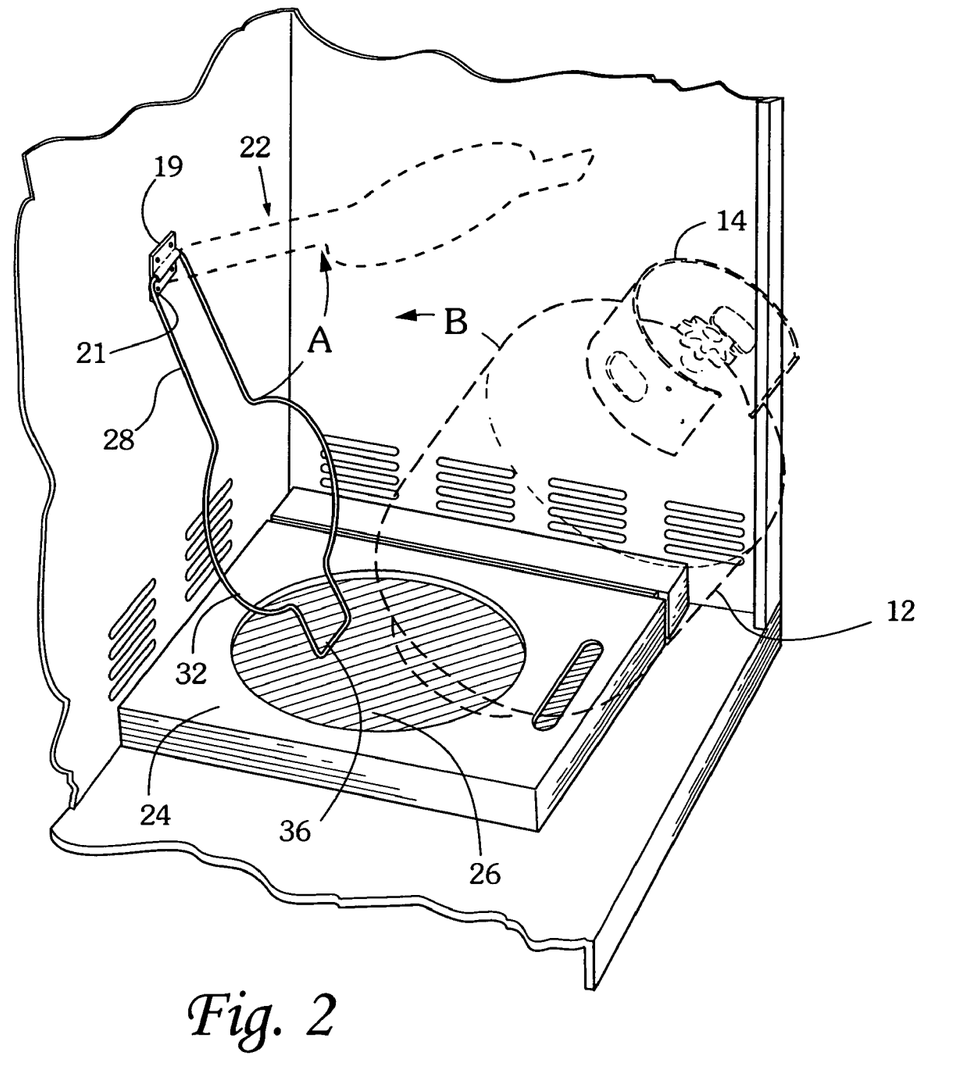
FIG. 2 is a perspective view of the inside of a grill showing the invention.

Referring to FIG. 2, securing device 22 is carried by an interior wall of the grill through plate 19. Block 21 is carried by plate 19 and disposed below the securing device. An extension arm 28 can be included in the securing device. The securing device, when in a first unsecured position, occupies a space above base 24 and interferes with the fuel tank being placed in the grill. In order to place the fuel tank in the grill, securing device 22 must be moved in a direction shown as A, to a second unsecured position, so that tank 12 can be moved in a direction shown as B and placed in the grill. Once the tank is in place, the securing device can be lowered and help secure the fuel tank to the grill.

Figure 3:
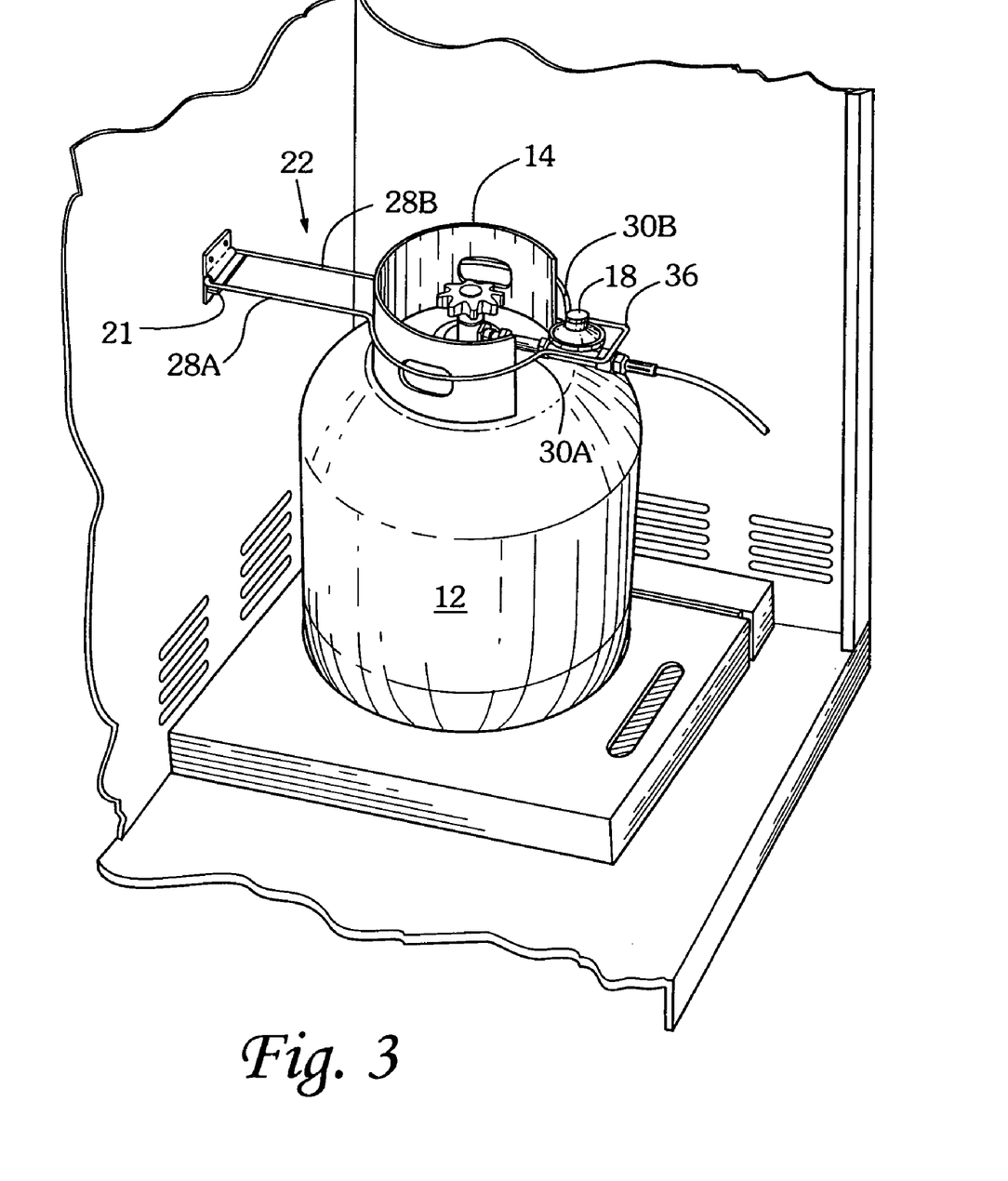
FIG. 3 is a perspective view of the inside of a grill showing the invention.

Referring now to FIG. 3, the securing device is shown in a secured position. Extension arms 28a and 28b can be included in the securing device. The securing device may also include a first retaining member 30a and second retaining member 30b carried by the extension arms. These retaining members define a collar area (shown as 34 in FIG. 5) for receiving tank collar 14. When the securing device is in a secured position, fuel tank collar 14 is received into collar area 34 and secured by retaining members 30a and 30b. Therefore, stability to fuel tank 12 is provided to help prevent the fuel tank from shifting positions, tipping, or losing. Securing device 22 may include a regulator receiving arm 36 which defines a regulator area (shown as 38 in FIG. 5) for receiving fuel line regulator 18 so that securing device 22 may secure fuel tank 12 without being hindered by fuel line regulator 18.

Figure 4:
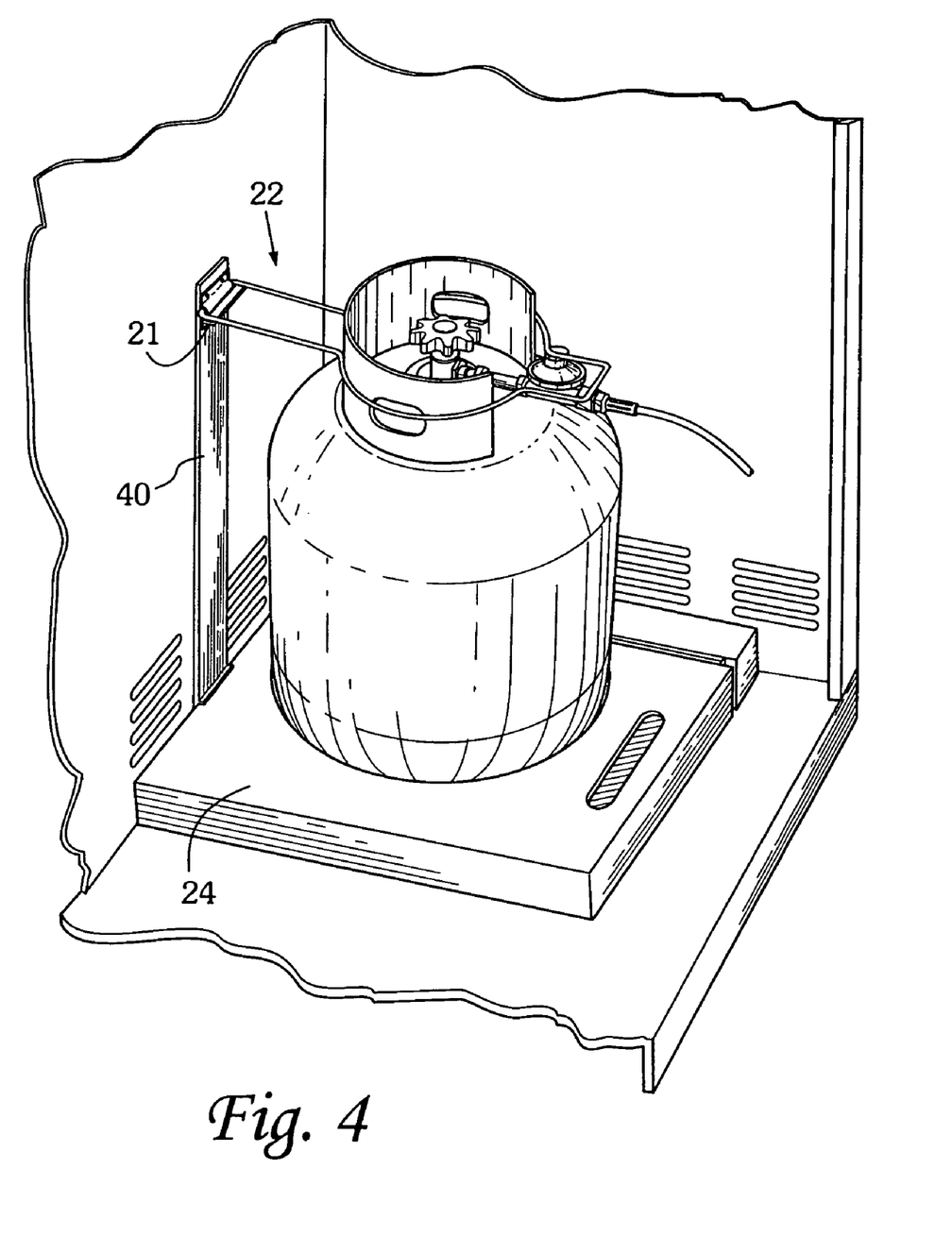
FIG. 4 is a perspective view of the inside of a grill showing the invention.

Referring now to FIG. 4, another embodiment of the invention is shown. Securing device 22 is pivotally carried by a support 40. Support 40 is carried by the grill by any means generally known in the art so that support element 40 may be part of an after market addition for a grill. The support may be integral with base 24 or may be attached to the base by any means generally known in the art. Support element 38 may also be separate and unattached to base 24 and carried by an interior wall of the grill.

Figure 5:
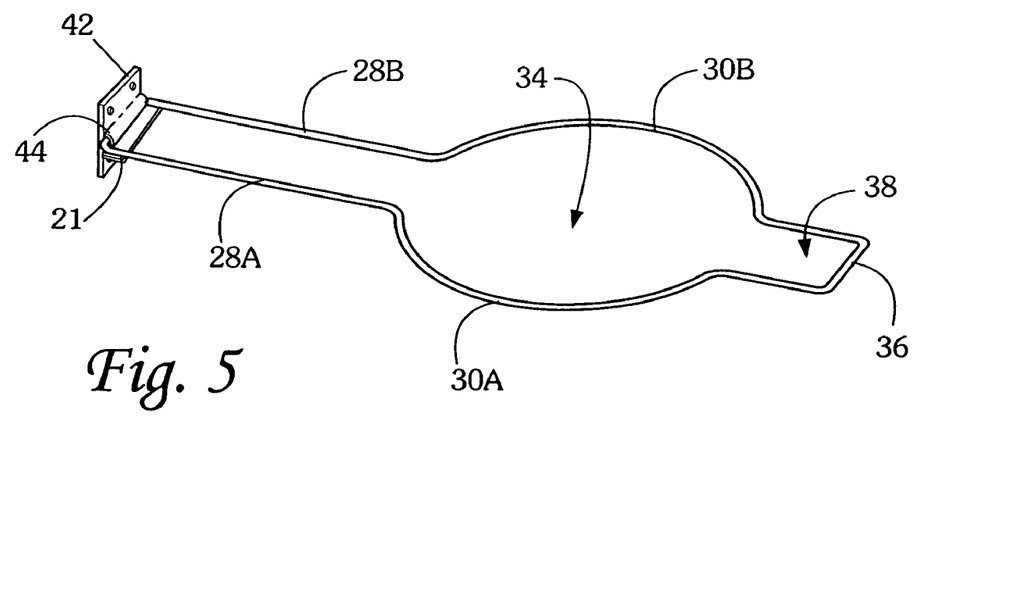
FIG. 5 is a perspective view of the invention.

Referring now to FIG. 5, extension arm 28 is sufficient to extend retaining members 30a and 30b an appropriate distance from the grill housing so that tank collar 14 is received in collar area 34 while allowing fuel tank 12 to remain in an upright position. Block 21 is shown carried by plate 19 so that the securing device interferes with placing the fuel tank in the internal space of the grill when in the first unsecured position. In this embodiment, the retaining members are integral with extension arms 26a and 26b and define collar area 34 which has generally the same shape and diameter as tank collar 14. In the shown embodiment, regulator receiving arm 36 is integral to the retaining members and defines regulator area 38 that allows collar area 34 to receive tank collar 14 without being obstructed by the fuel line regulator 18. It should be noted that this invention is also applicable to outdoor grills which have the fuel tank external to any interior of the outdoor grill.

Figure 6:
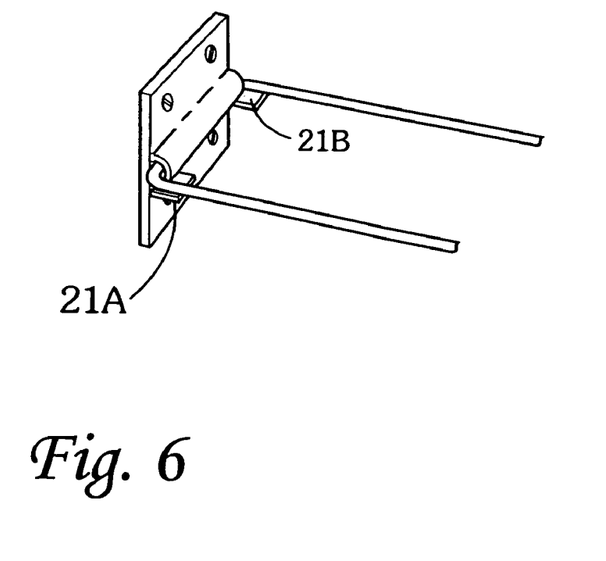
FIG. 6 is a perspective view of the invention.

Referring to FIG. 6, block 21 may comprise block member 21a and 21b which support a left and right extension arms of securing device 22, respectively. Further, the invention may only contain one of the blocks to support the securing member.

In one embodiment, the receiving arm and extension arm are not integral to the retaining members but are attached to the retaining members by any means generally known in the art.

Figure 7:
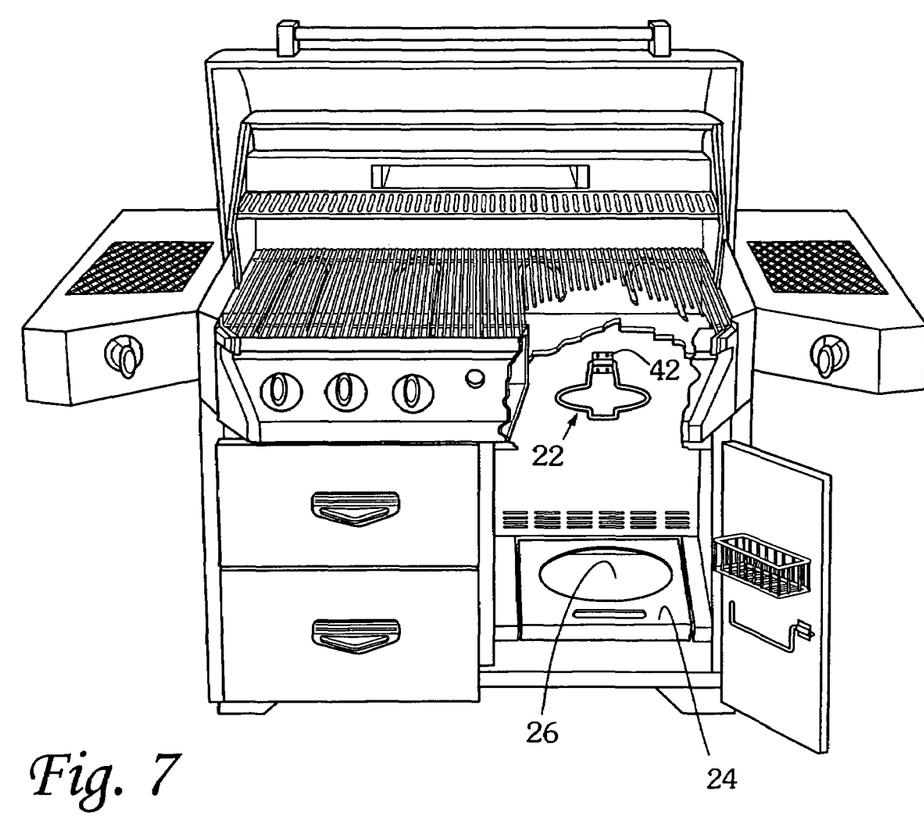
FIG. 7 is a perspective view of the invention without a fuel tank.

Referring now to FIG. 7, the securing device is shown in the first unsecured position.

While a preferred embodiment of the invention has been described using specific terms, such description is for illustrative purposes only, and it is to be understood that changes and variations may be made without departing from the spirit or scope of the following claims.

What is claimed is:

1. A safety device for an outdoor grill comprising:
   an outdoor grill having a grill frame;
   a regulator carried by said grill frame;
   a tank receiving area included in said grill frame for receiving a fuel tank, said fuel tank having a collar;
   a securing arm having a first end carried by said grill frame, said securing arm having a blocking position wherein said securing arm extends into said tank receiving area and interferes with the ability to place said fuel tank into said tank receiving area, a retracted position wherein said securing arm is elevated above said tank receiving area allowing for said fuel tank to be placed within said tank receiving area, and a secured position wherein said securing arm secures said fuel tank within said tank receiving area;
   a collar receiving area defined by said securing arm adapted to receive said collar of said fuel tank when said fuel tank is placed in said tank receiving area and said securing arm is placed in said secured position; and,
   a regulator receiving area disposed adjacent said collar receiving area and defined by a first regulator receiving arm carried by said securing arm, a second regulator receiving arm carried by said securing arm and a third regulator receiving arm disposed generally opposite said first end of said securing arm and interconnecting said first regulator receiving arm and said second receiving arm wherein said regulator receiving area is adapted to receive said regulator when said securing arm is in said secured position so that said regulator may be used and positioned without interference from said securing arm when said regulator is connected to said fuel tank and said securing arm is in said secured position.

2. The device of claim 1 including a securing arm block carried by said grill for engaging said securing arm to cause said securing arm to be in said blocking position.

3. The device of claim 1 including:
   at least one extension arm carried by said securing arm; and,
   at least one retaining member carried by said extension arm for defining said collar receiving area.

4. A safety device for securing a fuel tank having a collar to an outdoor grill comprising:
   an outdoor grill having a grill frame;
   a regulator carried by said grill;
   an interior space defined by said grill frame;
   a tank receiving area included in said interior space of said outdoor grill;
   a securing arm having a first end and a generally opposite second end wherein said first end is pivotally carried by said grill frame, said securing arm having a blocking position wherein said second end of said securing arm extends into said tank receiving area and interferes with the ability to place said tank into said tank receiving area, a retracted position wherein said second end of said securing arm is elevated above said tank receiving area allowing for said tank to be placed within said tank receiving area, and a secured position wherein said securing arm secures said fuel tank within said tank receiving area; and,
   a collar receiving area defined by said securing arm and adapted to receive said collar of said fuel tank when said fuel tank is placed in said tank receiving area and said securing arm in placed in said secured position; and
   a regulator receiving area disposed adjacent said collar receiving area and defined by a first regulator receiving arm carried by said securing arm, a second regulator receiving arm carried by said securing arm and a third regulator receiving arm generally disposed at said second end of said receiving arm and interconnecting said first regulator receiving arm and said second receiving arm wherein said regulator receiving area is adapted to receive said regulator so that said regulator may be used and positioned without interference from said securing arm when said regulator is connected to said fuel tank and said securing arm is in said secured position.

5. The device of claim 4 including a securing arm block carried by said grill for engaging said securing arm to cause said securing arm to be in said blocking position.

6. The device of claim 4 including:
   at least one extension arm carried by said securing arm; and,
   at least one retaining member carried by said extension arm for defining said collar receiving area.

7. The device of claim 4 including a regulator receiving arm carried by said securing arm for defining said regulator receiving area.

8. A method of securing a fuel tank to an outdoor gas grill comprising the steps of:
   providing an outdoor grill having a grill frame, a base and a tank receiving area defined by said grill frame and said base;
   providing a tank for connecting to said outdoor grill, said tank having a collar;
   providing a securing arm carried by said grill frame having a longitudinal axis extending between a first end and a second end of said securing arm, a resting position wherein said securing arm is adjacent to said grill frame and said longitudinal axis is in a perpendicular relation to said base, a blocking position wherein said securing arm extends into said tank receiving area so that said longitudinal axis is in a generally parallel relation to said base so that said securing arm does not contact said base and interferes with the ability to place said tank into said tank receiving area, a retracted position wherein said securing arm is elevated above said tank receiving area allowing for said tank to be placed within said tank receiving area, and a secured position wherein said securing arm is lowered around the circumference of said collar of said tank and secures said tank within said tank receiving area, and a collar receiving area defined by said securing arm and adapted to circumferentially receive said collar when said tank is placed in said tank receiving area and said securing arm is placed in said secured position;

positioning said securing arm in said retracted position;

placing said tank on said outdoor grill;

placing said securing arm in said secured position so that said collar receiving area of said securing arm receives said collar of said tank thereby securing said tank to said grill; and, connecting said outdoor grill to said tank.

9. The method of claim 8 wherein:

said step of providing a securing arm includes the step of providing a securing arm having a regulator receiving area defined by a first regulator receiving arm carried by said securing arm, a second regulator receiving arm carried by said securing arm and a third regulator receiving arm generally disposed at said second end of said receiving arm and interconnecting said first regulator receiving arm and said second receiving arm; and, said step of placing said securing arm in said secured position includes the step of placing said securing arm in said secured position so that said regulator receiving area receives the regulator of said outdoor grill.

10. The method of claim 8 wherein:

said step of providing an outdoor grill includes the step of providing an outdoor grill having a housing carried by said grill frame and an interior space defined by said housing and said base wherein said tank receiving area is disposed within said interior space;

said step of providing a securing arm includes the step of providing a securing arm carried by said outdoor grill within said interior space; and, said step of placing said tank on said outdoor grill includes the step of placing said tank in said tank receiving area of said outdoor grill.

11. The method of claim 8 wherein said step of providing a securing arm includes the step of providing a securing arm having at least one extension arm and at least one retaining member for defining said collar area.

12. The method of claim 8 wherein said step of providing a securing arm includes the step of providing a securing arm having a regulator receiving arm defining a regulator receiving area.

* * * * *